US010816396B2

(12) United States Patent
Meron et al.

(10) Patent No.: US 10,816,396 B2
(45) Date of Patent: Oct. 27, 2020

(54) ADJUSTABLE SECURITY SENSING DEVICE (71) Applicant: Essence Security International (E.S.I.) Ltd., Hezlia Pituach (IL)

(72) Inventors: Sergey Meron, Netanya (IL); Igal Nekhanevich, Rishon-LeZion (IL); Reuben Koren, Haifa (IL)

(73) Assignee: Essence Security International (E.S.I.) Ltd., Herzlia Pituach (IL)

( * ) Notice: Subject to any disclaimer, the term of this patent is extended or adjusted under 35 U.S.C. 154(b) by 349 days.

(21) Appl. No.: 15/359,730

(22) Filed: Nov. 23, 2016

(65) Prior Publication Data
US 2017/0146397 A1 May 25, 2017

Related U.S. Application Data (60) Provisional application No. 62/258,565, filed on Nov. 23, 2015.

(51) Int. Cl.
| | | |
|---|---|---|
| *G01J 1/42* | (2006.01) | |
| *G01J 1/02* | (2006.01) | |
| *G01J 1/04* | (2006.01) | |
| *G02B 3/08* | (2006.01) | |
| *G01J 5/08* | (2006.01) | |
| *G01J 5/00* | (2006.01) | |
| *G08B 13/193* | (2006.01) | |

(52) U.S. Cl.
CPC ............ *G01J 1/4228* (2013.01); *G01J 1/029* (2013.01); *G01J 1/044* (2013.01); *G01J 1/0411* (2013.01);
(Continued)

(58) Field of Classification Search
CPC ........ G01J 1/4228; G01J 1/029; G01J 1/0411; G01J 1/044; G01J 1/0448; G01J 5/0022;
(Continued)

(56) References Cited

U.S. PATENT DOCUMENTS 4,960,995 A * 10/1990 Neumann ............... G08B 13/19
250/338.3
5,739,753 A * 4/1998 Porter .................... G08B 13/19
250/342
(Continued)

FOREIGN PATENT DOCUMENTS

| CA | 2300644 | 7/2009 |
|---|---|---|
| EP | 1120763 | 8/2001 |
| EP | 1847822 | 10/2007 |

OTHER PUBLICATIONS

European Search Report and the European Search Opinion dated Jul. 10, 2017 From the European Patent Office Re. Application No. 16200297.6. (12 Pages).
(Continued)

*Primary Examiner* — John R Lee (57) ABSTRACT

A sensing device comprising an electromagnetic sensor having a surface with a plurality of different electromagnetic radiation interception areas arranged one above the other, one or more controllable flaps adapted to cover one or more of the different electromagnetic radiation interception areas preventing the electromagnetic sensor from intercepting electromagnetic radiation on the covered electromagnetic radiation interception areas, at least one control mechanism adapted to maneuver the controllable flaps so as to change the covered electromagnetic radiation interception areas and a plurality of lenses located in front of the electromagnetic sensor, each having a different focal length. One of the lenses has a certain focal length and focuses electromagnetic radiation to at least one of the different electromagnetic radiation interception areas, and another of the lenses has a different focal length and focuses electromagnetic radiation to another electromagnetic radiation interception area.

14 Claims, 7 Drawing Sheets (52) U.S. Cl.
CPC .......... *G01J 1/0448* (2013.01); *G01J 5/0022* (2013.01); *G01J 5/0025* (2013.01); *G01J 5/0806* (2013.01); *G01J 5/089* (2013.01); *G01J 5/0843* (2013.01); *G02B 3/08* (2013.01); *G08B 13/193* (2013.01); *G01J 2001/4233* (2013.01)

(58) Field of Classification Search
CPC ...... G01J 5/0025; G01J 5/0806; G01J 5/0843; G01J 5/089; G01J 2001/4233; G02B 3/08; G08B 13/193
See application file for complete search history.

(56) References Cited

U.S. PATENT DOCUMENTS

| | | | |
|---|---|---|---|
| 6,630,952 | B1 | 10/2003 | Beale |
| 2006/0266944 | A1 | 11/2006 | Chi et al. |
| 2009/0146063 | A1* | 6/2009 | Zhevelev .................. G01J 5/08 250/349 |
| 2013/0043396 | A1 | 2/2013 | Shpater |
| 2016/0246165 | A1* | 8/2016 | Wang .................... H04N 13/363 |
| 2017/0146397 | A1* | 5/2017 | Meron .................... G01J 1/029 |

OTHER PUBLICATIONS

Partial European Search Report dated Apr. 3, 2017 From the European Patent Office Re. Application No. 16200297.6. (7 Pages).
Communication Pursuant to Article 94(3) EPC dated Nov. 6, 2018 From the European Patent Office Re. Application No. 16200297.6. (5 Pages).
European Search Report and the European Search Opinion dated Jul. 30, 2019 From the European Patent Office Re. Application No. 19174010.9. (7 Pages).

\* cited by examiner

ADJUSTABLE SECURITY SENSING DEVICE

RELATED APPLICATION

This application claims the benefit of priority under 35 USC § 119(e) of U.S. Provisional Patent Application No. 62/258,565 filed on Nov. 23, 2015, the contents of which are incorporated herein by reference in their entirety.

FIELD AND BACKGROUND OF THE INVENTION

For brevity, the term sensor refers to a sensing device, and the term radiation refers to electromagnetic radiation.

The present invention, in some embodiments thereof, relates to an electromagnetic sensor, and more specifically but not exclusively, to a motion sensor, for detecting objects within a wide range of distances from the sensor.

One problem dealt with by the present invention is the need, when installing an off-the-shelf electromagnetic sensor, to control the range of distances from which the sensor intercepts energy. For example, let us look at a motion sensor installed next to a door with the purpose of detecting only people entering the door where the sensor is installed. If the motion sensor is capable of intercepting energy from objects up to 10 meters away and there is an additional door located 5 meters away from the sensor, the sensor can detect people entering both doors. In order for the sensor to detect only people entering the door where the sensor is installed, there is a need to limit the distance from which the sensor intercepts energy to less than 5 meters so that the sensor detects only people near the door where the sensor is installed.

SUMMARY OF THE INVENTION

It is an object of the invention to provide an adjustable electromagnetic sensor, such that at installation time or thereafter it is possible to control and change the depth of focus from which the sensor detects radiation.

The foregoing and other objects are achieved by the features of the independent claims. Further implementation forms are apparent from the dependent claims, the description and the figures.

According to a first aspect of the invention, a sensing device comprises: an electromagnetic sensor, having a surface with a plurality of different electromagnetic radiation interception areas arranged one above the other, one or more controllable flaps, adapted to cover one or more of the plurality of different electromagnetic radiation interception areas thus limiting a distance from the sensing device at which an object can be captured, at least one control mechanism adapted to maneuver the one or more controllable flaps so as to change the one or more covered electromagnetic radiation interception areas, and a plurality of lenses located in front of the electromagnetic sensor, each having a different focal length.

One of the plurality of lenses has a certain focal length and focuses electromagnetic radiation to at least one of the plurality of different electromagnetic radiation interception areas. Another of the plurality of lenses has a different focal length and focuses electromagnetic radiation to at least one other of the plurality of different electromagnetic radiation interception areas. Moving the one or more controllable flaps determines what part of the electromagnetic sensor's surface is covered, thus determining the depth of focus where objects are detected by the uncovered part of the electromagnetic sensor's surface.

According to a second aspect of the invention, a method of creating an adjustable sensing device, comprises: providing an electromagnetic sensor having a surface with a plurality of different electromagnetic radiation interception areas arranged one above the other, mounting a lens in front of the electromagnetic sensor, mounting a controllable flap in front of the electromagnetic sensor either in front of the lens or between the lens and the electromagnetic sensor, and mechanically attaching a control mechanism to one side of the controllable flap such that changing the position of the controllable flap changes the part of the electromagnetic sensor covered by the controllable flap.

According to a third aspect of the invention, a multiple-frame Fresnel lens sheet comprises: a first row of a plurality of Fresnel lenses with a first focal length and a second row of a plurality of other Fresnel lenses with a second focal length. The first focal length and the second focal length are different. Each member of the first row of a plurality of Fresnel lenses has a first diameter measured on a principle plane of each member of the first row of a plurality of Fresnel lenses. Each member of the second row of a plurality of other Fresnel lenses has a second diameter measured on the principle plane of each member of the second row of a plurality of other Fresnel lenses. The first diameter is different from said second diameter. The first focal length is longer than the second focal length and the first diameter is smaller than the second diameter.

With reference to the first and second aspects, in a first possible implementation of the first and second aspects the plurality of lenses are processed and cut on a single sheet of optical material, using processing and cutting techniques as known in the art.

With reference to the first and second aspects, in a second possible implementation of the first and second aspects, the plurality of lenses comprises Fresnel lenses.

With reference to the first and second aspects, in a third implementation of the first and second aspects the one or more controllable flaps prevents the electromagnetic sensor from intercepting the electromagnetic radiation on the one or more covered electromagnetic radiation interception areas.

With reference to the first and second aspects, in a fourth implementation of the first and second aspects the one or more controllable flaps comprise a multi-position flap. Changing the angle between the multi-position flap and the surface of the electromagnetic sensor changes the one or more covered electromagnetic radiation interception areas.

With reference to the first and second aspects, in a fifth implementation of the first and second aspects the one or more control mechanisms comprises a lever or a motor physically connected to one side of the multi-position flap. Applying effort to the lever or turning the motor's shaft changes the angle between the multi-position flap and the surface of the electromagnetic sensor. As the angle between the multi-position flap and the surface of the electromagnetic sensor determines the depth of focus where objects are detected by the uncovered part of the electromagnetic sensor's surface, the lever connected to the multi-position flap allows controlling the depth of focus where objects are detected by the uncovered part of the electromagnetic sensor's surface.

With reference to the first, second and third aspects, in a sixth implementation of the first, second and third aspects the plurality of lenses is a multi-frame Fresnel lens sheet. The lenses on the sheet are arranged in an array having multiple parallel rows. One side of the array is the top side of the array and the multiple parallel rows are arranged one above the other parallel to the top side of the array. A first row of a plurality of lenses has a first focal length and a second row of a plurality of other lenses has a second focal length. The first focal length is longer than the second focal length and the first row of a plurality of lenses is closer to the top side of the array than the second row of a plurality of other lenses.

Having the lenses in this order allows reducing the focal depth where objects are detected by the uncovered part of the electromagnetic sensor's surface incrementally by incrementally covering parts of the electromagnetic sensor's surface starting at the side near the top of the array of lenses. Each member of the first row of a plurality of lenses has a first diameter measured on a principle plane of each member of the first row of a plurality of lenses. Each member of the second row of a plurality of other lenses has a second diameter measured on the principle plane of each member of the second row of a plurality of other lenses. The first diameter and the second diameter are different. The first diameter is smaller than the second diameter.

Lenses with a smaller diameter and longer focal length are higher on the multiple-frame Fresnel lens sheet than lenses with a larger diameter and shorter focal length. A moving object at a farther distance from the sensor passes a greater linear distance than another moving object closer to the sensor passing the same angular distance. As a result, radiation from the farther object is intercepted at a lower frequency than radiation from the nearer object. In order to reduce the difference between frequencies of the radiation the sensor intercepts from objects at different distances, the lenses with the greater focal length are smaller than the lenses with the shorter focal length.

With reference to the first, second and third aspects, and the sixth implementation manner of the first, second and third aspects, in a seventh implementation of the first, second and third aspects the multiple-frame Fresnel lens sheet is composed of material selected from a group comprising, but not limited to, optical PVC (Polyvinyl Chloride) and optical polycarbonate. The material is translucent such that at least 5% of infra-red, visible and ultra-violet light striking the sheet composed of the material is allowed to pass through, and the material is flexible such that when force is applied to the sheet composed of the material in a three-point flexural test the sheet deflects by at least 2 centimeters without breaking. Composing a multiple-frame Fresnel lens sheet from material that is translucent and flexible as described allows it to be curved around a longitudinal axis of the sensor, to concentrate all received radiation onto the sensing panel.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s).

In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A typical electromagnetic sensor comprises a sensing surface, for intercepting electromagnetic energy such as visible light, thermal infra-red energy or naturally emitted microwave energy. In some embodiments the sensing surface may be a sensing panel having a plurality of different electromagnetic radiation interception areas. In these embodiments, electromagnetic radiation may be focused to different interception areas on the sensing panel. In these embodiments, electromagnetic radiation received from objects located at different distances may be focused to different interception areas on the sensing panel. In these embodiments, covering one or more of the interception areas of the sensing panel prevents the sensing panel from intercepting electromagnetic radiation received from objects located at distances focused to the covered area, thus reducing the set of distances from which the sensor detects object.

In some embodiments of the present invention, the sensor may detect light radiation, for example visible light or infra-red radiation. In such embodiments, one or more lenses with different optical properties may be placed in front of the sensing panel, for focusing radiation received from objects at different distances from the sensor to different interception areas on the sensing panel.

Optionally, one or more of the lenses placed in front of the sensing panel may have multiple optical properties, for example a multi-focal lens.

In some embodiments of the present invention, a lens array may be placed in front of the sensing panel. In such embodiments, the lenses in the array may have different optical properties, where one or more lenses focus radiation received from objects located at a specific distance from the sensor and other one or more lenses focus radiation received from other objects located at a different distance.

In these embodiments the lens array may be a multiple-frame Fresnel lens sheet having at least two frames, wherein each of the at least two frames is cut and processed to create a Fresnel lens using cutting and processing techniques as are known in the art. The Fresnel lenses comprising the lens array may focus radiation received from objects located at different distances from the sheet.

In some embodiments of the present invention, one or more adjustable moving flaps may be used to dynamically cover one or more interception areas of the sensing panel. In these embodiments, moving the flap determines what part of the sensing panel is covered, thus determining the depth of focus where objects are detected by the uncovered part of the sensing panel.

In some embodiments of the present invention, the sensor may be a passive infra-red (PIR) sensor.

In some embodiments of the present invention, where the electromagnetic sensor has a plurality of different electromagnetic radiation interception areas, electromagnetic radiation may be intercepted by all of the different electromagnetic radiation interception areas or by only some of the different electromagnetic radiation interception areas of the sensor.

It is noted that the present invention refers to sensing devices comprising one or more sensing panels. Some of the diagrams depict a sensing device comprising two sensing panels; however the present invention is not limited to such embodiments.

Figure 1:
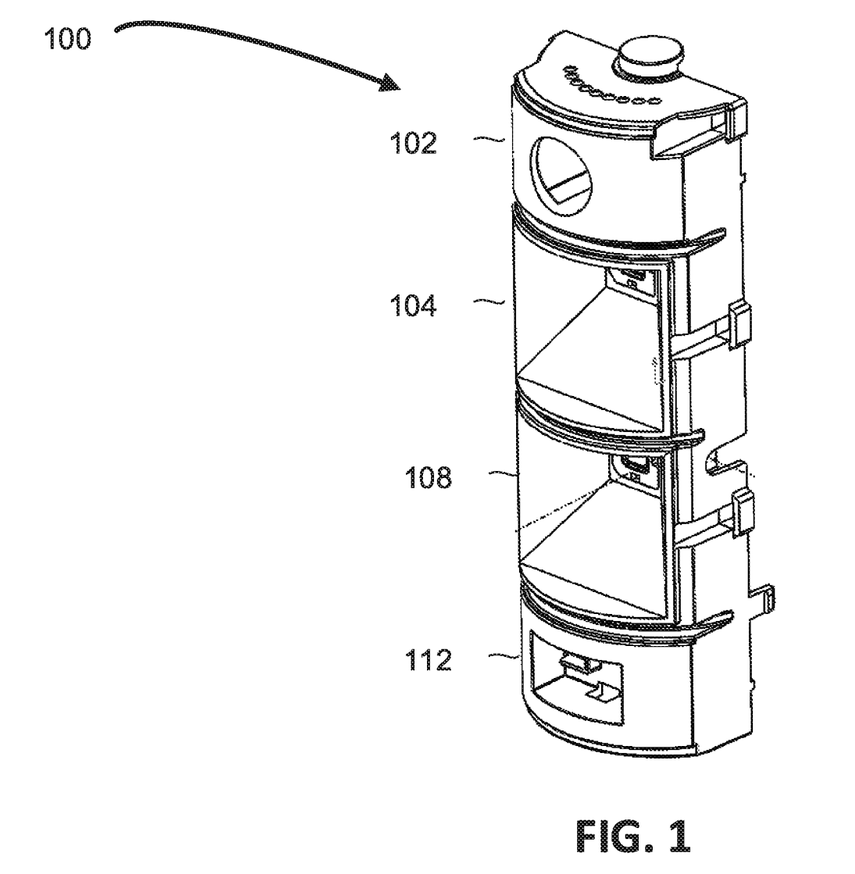
FIG. 1 is a schematic illustration of an exemplary sensing device according to some embodiments of the present invention.

Reference is now made to FIG. 1, showing a schematic illustration of an exemplary sensing device 100 comprising two sensing panels, 104 and 108, according to some embodiments of the present invention.

Figure 2:
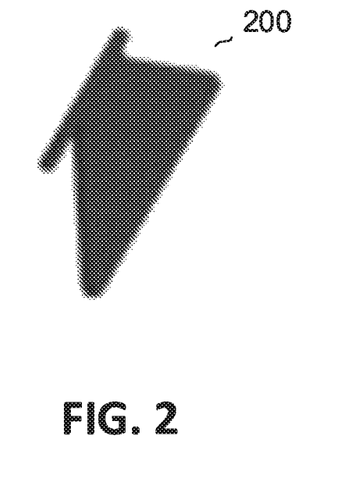
FIG. 2 is a schematic illustration of an exemplary flap for covering a sensing panel, according to some embodiments of the present invention.

Reference is now made to FIG. 2, showing a schematic illustration of an exemplary flap 200, according to some embodiments of the present invention. In these embodiments, flap 200 may be mounted over a sensor and used to cover part of the sensing panel.

In some embodiments, the sensing device further comprises a lens located in front of the sensor. Optionally, the lens may be a lens array, for example a multiple-frame Fresnel lens sheet, having multiple frames with different optical characteristics and where the multiple frames are arranged in multiple parallel rows. In some embodiments comprising a movable flap and a lens, the flap may be mounted between the sensing panel and the flap. In other embodiments comprising a movable flap and a lens the flap may be mounted in front of the lens.

In some embodiments comprising multiple lenses, the multiple lenses may be mounted in multiple parallel rows, one row above the other.

In some embodiments comprising multiple lenses mounted in multiple parallel rows, the lenses may be cut with different focal lengths. In some embodiments where all lenses on one of the multiple parallel rows have the same certain focal length, all other lenses in all lower rows may have a focal length that is not longer than the certain focal length.

In some embodiments comprising multiple lenses, the multiple lenses may be processed and cut from a single sheet of optical material using processing or cutting techniques as known in the art.

In some embodiments comprising at least one lens, the at least one lens may be a Fresnel lens.

Figure 5:
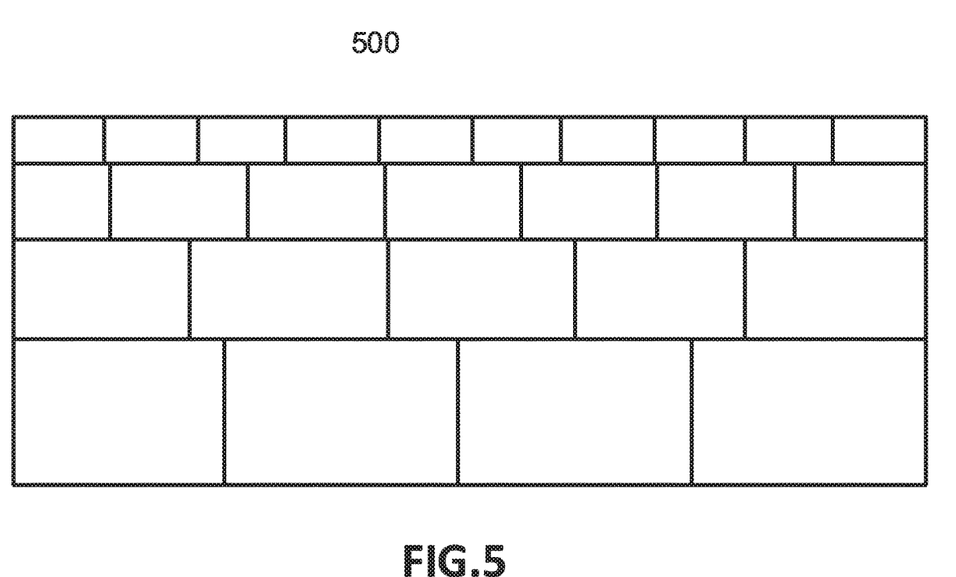
FIG. 5 is a schematic illustration of an exemplary lens array sheet, according to some embodiments of the present invention.

FIG. 5 shows a schematic illustration of an exemplary multiple-frame Fresnel lens sheet 500, according to some embodiments of the present invention. In these embodiments the frames are arranged in multiple parallel rows, one row above the other.

Figure 6:
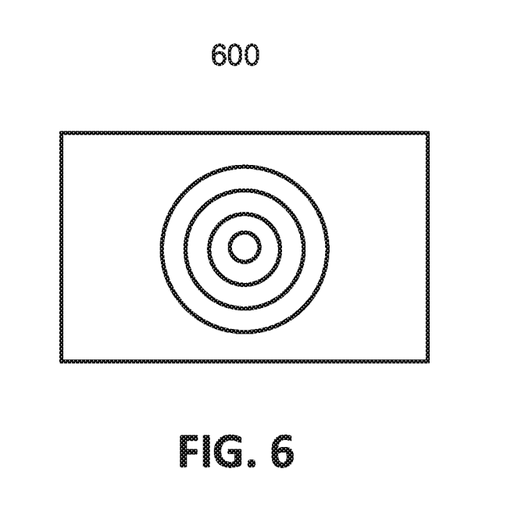
FIG. 6 is a schematic illustration of the top view of a single lens from an exemplary lens array sheet; where the lens is a Fresnel lens, according to some embodiments of the present invention.
Figure 7:
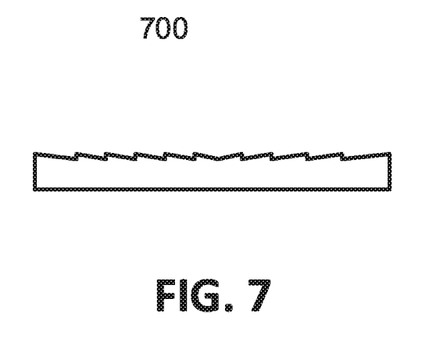
FIG. 7 is a schematic illustration of the cross section of the lens shown in FIG. 6, according to some embodiments of the present invention.

In these embodiments each frame may be cut and processed as a Fresnel lens, using cutting or processing techniques as known in the art. FIG. 6 shows a schematic illustration of a flattened top view 600 of a single frame from an exemplary multiple-frame sheet where the frame is a Fresnel lens, according to some embodiments of the present invention. FIG. 7 shows a schematic illustration of a vertical cross section 700 of the same single frame, according to some embodiments of the present invention.

Figure 3:
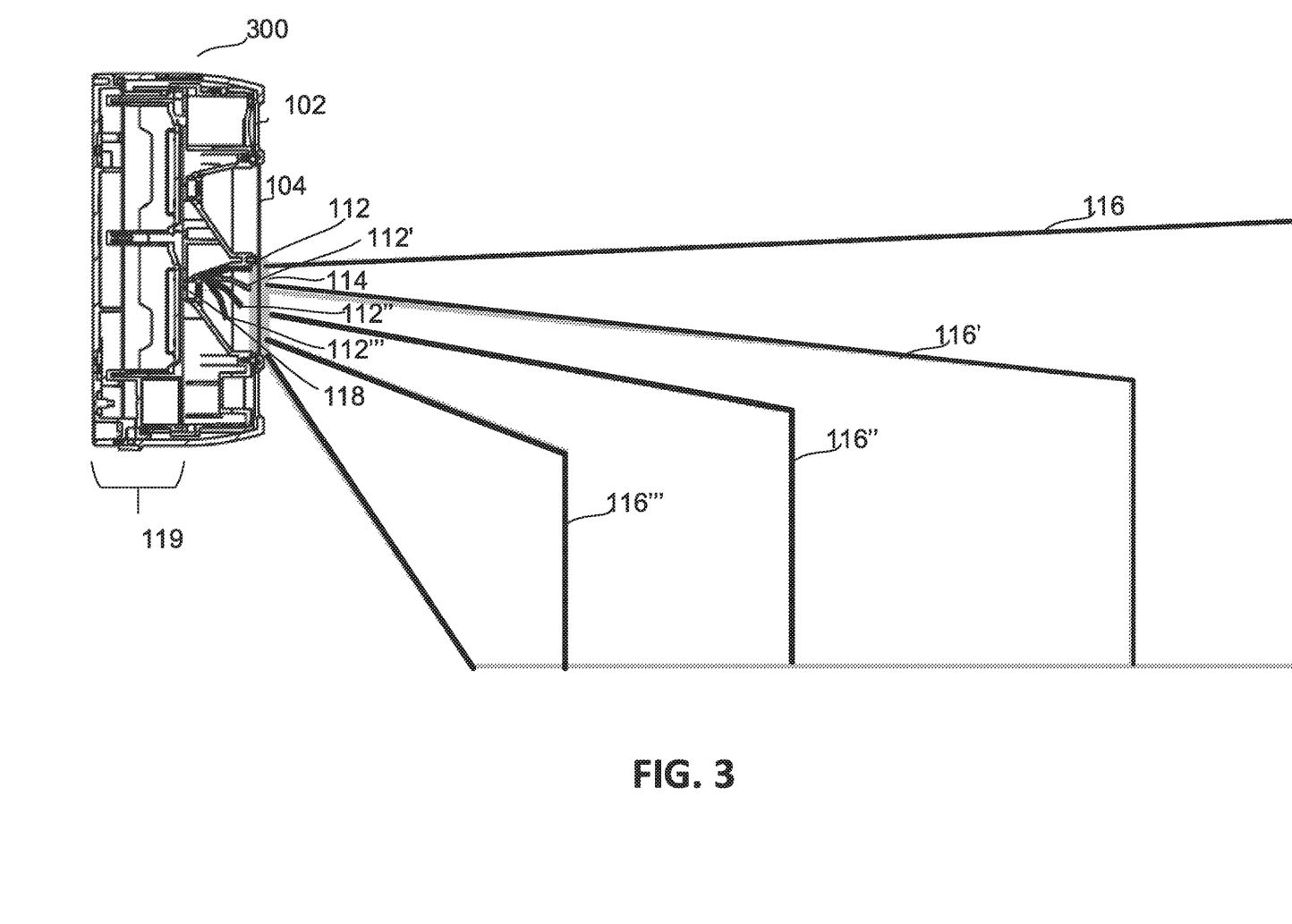
FIG. 3 is a schematic partial illustration of another exemplary sensor according to the present invention, having a depth control mechanism based on an adjustable moving flap.

Referring now to FIG. 3, showing a schematic illustration of an exemplary sensing device 300 comprising two sensing panels 104 and 118 and a movable flap for covering part of the bottom sensing panel 118, according to some embodiments of the present invention. In these embodiments, the flap may be placed at an angle to the sensor, in one of multiple positions, for example 112, 112', 112" or 112'". In some embodiments the sensing device may further comprise a lens 114, installed in front of sensing panel 118. In FIG. 3 the lens 114 is installed in front of the flap 112; however the present invention is not limited to such embodiments.

Lens 114 may be a multiple-frame Fresnel lens sheet, where the multiple lenses have different focal lengths, for example 116, 116', 116" and 116'". In such embodiments the multiple lenses may be arranged on the multiple-frame Fresnel lens sheet in multiple parallel rows in decreasing order of focal length, starting at the top of the sheet. The flap may be installed such that at each position the flap blocks the lenses from a particular row and is associated with one of the decreasing focal lengths.

For example when the flap is in position 112, sensing panel 118 is entirely exposed and radiation from objects at all distances up to 116 can be intercepted by the sensing panel 118. When the flap is placed in position 112', the top part of sensing panel 118 is covered such that radiation focused by the top part of lens 114 is blocked and can no longer be intercepted by the sensing panel. As a result, the sensing panel can intercept radiation only from objects up to distance 116'. When the flap is in position 112" more of the sensing panel is covered and the sensing panel can intercept radiation only from objects up to distance 116" and when the flap is in position 112'" even more of the sensing panel is covered and the sensing panel can intercept radiation only from objects up to distance 116'". The position of the flap determines the range of distances at which the sensor can detect objects.

In some embodiments of the present invention comprising a flap, a control mechanism may be installed for controlling the position of the flap. Examples of control mechanisms are a handle, a lever, a cord, and a motor.

Figure 4:
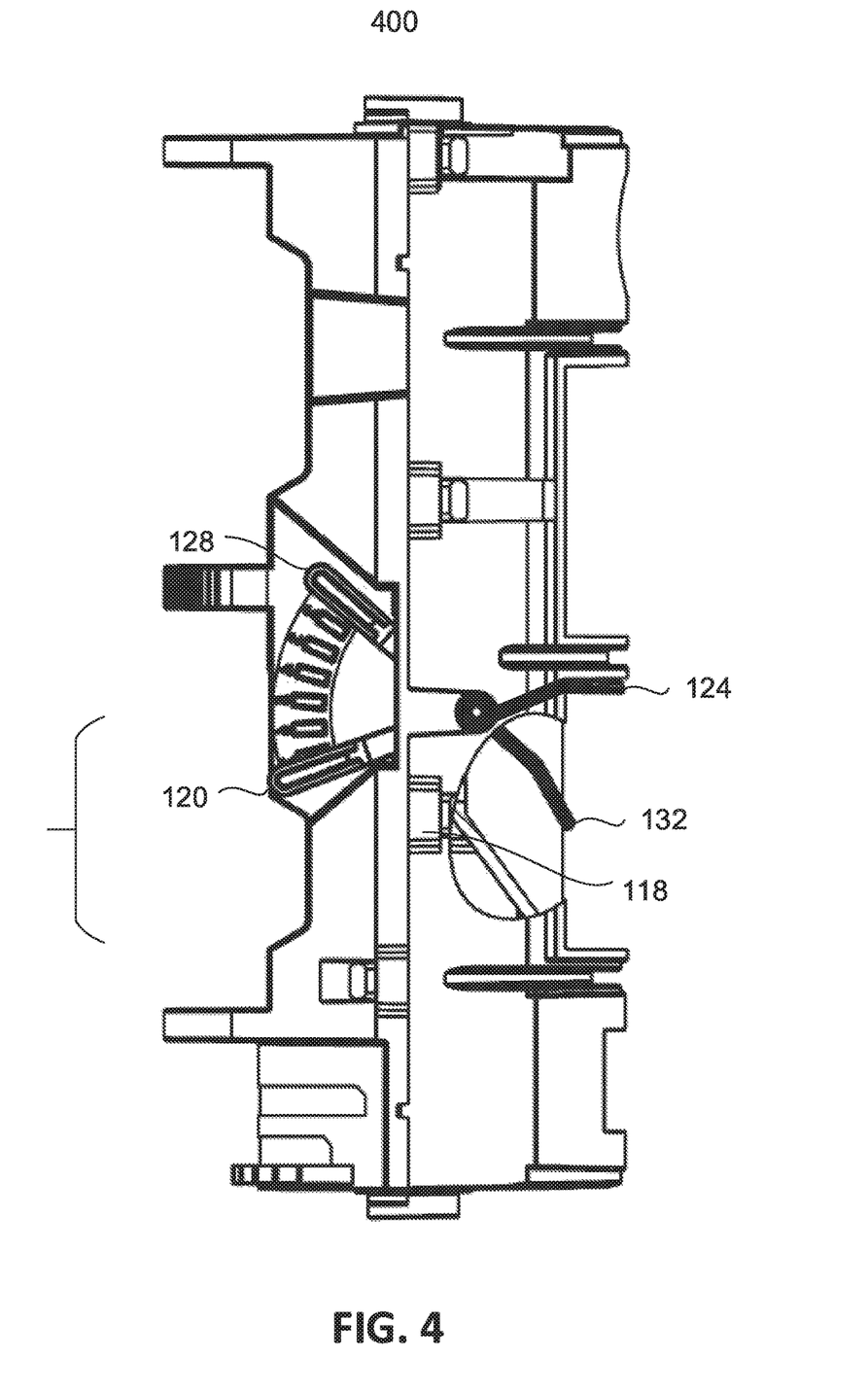
FIG. 4 is a schematic partial illustration of another exemplary sensor according to the present invention, having a depth control mechanism based on an adjustable moving flap and using a positioning lever.

FIG. 4 shows a schematic partial illustration of an exemplary sensing device 400 comprising a sensing panel 118, having a movable flap and a lever, according to some embodiments of the present invention. In such embodiments, the lever may be moved to one of a plurality of positions, for example 120 and 128. When the lever is put in position 120 it moves the flap to position 124, fully exposing sensing panel 118. When the lever is put in position 128 it moves the flap to position 132, covering part of sensing panel 118 and reducing the other part of the sensing panel on which the sensor intercepts radiation. Radiation from objects at distances focused to the covered part of the sensor will not be detected.

In some embodiments comprising a control mechanism and a sensor sharing a housing, there may be markings on the control mechanism or the housing to indicate the association between the position of the control mechanism and the set of distances from which the sensor detects objects.

In some embodiments, the housing of the sensing device may comprise multiple sensing panels, having one or more lenses located in front of the multiple sensing panels. Some embodiments having multiple sensing panels may have separate lenses in front of the multiple sensing panels. In other embodiments, the multiple sensing panels may have a single lens in front of two or more of the multiple sensing panels, wherein the single lens comprises a plurality of optical areas with different optical characteristics.

A moving object at a farther distance from the sensor passes a greater linear distance than another moving object closer to the sensor passing the same angular distance. As a result, radiation from the farther object is intercepted at a lower frequency than radiation from the nearer object. In order to reduce the difference between frequencies of the radiation the sensor intercepts from objects at different distances, multiple lenses may be of different sizes. In some embodiments of the present invention, lenses with a greater focal length may be smaller than lenses with a shorter focal length.

Referring back to FIG. 5, showing a multiple-frame Fresnel lens sheet wherein every one of the multiple frames is a Fresnel lens. In some embodiments the multiple lenses are arranged in multiple parallel rows, one row above the other, wherein all lenses on a row are of the same size and wherein a single lens on any row is no smaller than other lenses on the rows above the single lens. In such embodiments, the multiple lenses may have different focal lengths, where all lenses of the multiple lenses having the same size have the same focal length, and any one lens of the multiple lenses is smaller than any other lens of the multiple lenses having a shorter focal length than the focal length of the one lens. As a result, in such embodiments, radiation from objects farther from the sensor than other objects is focused by lenses of the multiple lenses on rows higher than other lenses of the multiple lenses focusing radiation from the other nearer objects.

In some embodiments comprising a lens, the lens may be composed of a material selected from a group comprising optical PVC (Polyvinyl Chloride) and optical polycarbonate. In such embodiments, the material may be such that it is not opaque to the electromagnetic radiation intercepted by the sensor. For example, the material may be such that at least 5% of infra-red, visible and ultra-violet light striking a sheet of said material is allowed to pass through.

In some embodiments comprising a lens, the lens may be curved around a longitudinal axis of the sensor, to concentrate all received radiation onto the sensing panel. For example, the lens may be made of material flexible enough such that when force is applied to a sheet composed of the material in a three-point flexural test the sheet deflects by at least 2 cm without breaking.

Some embodiments of the present invention may comprise one or more flaps for covering different areas of the sensor. In such embodiments the one or more flaps may reduce the set of distances from which the sensor detects radiation not only by setting a maximum distance, but may also set a minimum distance or a specific range of distances.

In some embodiments comprising a lens or multiple-frame lens sheet having multiple areas with different optical properties, the multiple areas may be arranged in an order other than parallel rows, for example concentric circles.

Embodiments comprising a lens or multiple-frame lens sheet having multiple areas with different optical properties may comprise one or more movable flaps installed such that each position is associated with one or more of the multiple areas with different optical properties.

In some embodiments having one or more movable flaps, the flaps may be adjusted once during the installation of the sensor. In other embodiments, the mechanism for moving the one or more movable flaps may be installed allowing moving one or more of the one or more movable flaps after installing the sensor.

In some embodiments the sensing device may be mounted, for example on a wall, a door frame or a pole. In some embodiments the sensing device may be mounted indoors; in other embodiments the sensing device may be mounted outdoors.

In some embodiments the sensor may be adapted to deliver an electric current upon detection of an object. In these embodiments, the electric current can be used to activate an electrical apparatus, for example turn on a light or trigger an alarm signal.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant sensors, lenses and flaps will be developed and the scope of the terms sensor, lens and flap is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A motion sensing device, comprising:
an electromagnetic sensor and a plurality of lenses located in front of said electromagnetic sensor, wherein the plurality of lenses is a multi-frame Fresnel lens sheet that is curved around a longitudinal axis of the sensing device, the lenses on the sheet being arranged in an array having multiple parallel rows, comprising a first and a second row for receiving electromagnetic radiation from objects located at different distances, wherein one side of the array is a top side of the array and the multiple parallel rows are arranged one above the other parallel to the top side of the array;

one or more controllable flaps mounted between the electromagnetic sensor and the lens sheet; and at least one control mechanism adapted to maneuver said one or more controllable flaps to determine a range of distances at which the sensing device can detect people.

2. The sensing device according to claim 1, wherein the one or more controllable flaps are maneuverable to block the lenses from a particular row of the multiple parallel rows that are arranged one above the other to reduce the range of distances from which the sensing device can detect people.

3. The sensing device according to claim 1, wherein lenses of different rows are of different sizes to reduce a difference between frequencies of the radiation received from objects passing the sensor at different distances from the sensor.

4. The device according to claim 3, wherein each member of the first row of a plurality of Fresnel lenses has a first diameter measured on a principle plane of each member of the first row of a plurality of Fresnel lenses, each member of the second row of a plurality of other Fresnel lenses has a second diameter measured on the principle plane of each member of the second row of a plurality of other Fresnel lenses, the second diameter being different to the first diameter.

5. The device according to claim 4, wherein the first row of a plurality of lenses is closer to the top side of the array than said second row of a plurality of other lenses, and the first diameter is smaller than said second diameter.

6. The sensing device of claim 1, wherein:
the first row of the plurality of lenses has a first focal length;
the second row of the plurality has a second focal length; and
said first focal length and said second focal length are different.

7. A method of creating an adjustable motion sensing device, comprising:
providing an electromagnetic sensor and a plurality of lenses located in front of said electromagnetic sensor, wherein the plurality of lenses is a multi-frame Fresnel lens sheet that is curved around a longitudinal axis of the sensing device, the lenses on the sheet being arranged in an array having multiple parallel rows, comprising a first and a second row, for receiving electromagnetic radiation from objects located at different distances, wherein one side of the array is a top side of the array and the multiple parallel rows are arranged one above the other parallel to the top side of the array;

mounting one or more controllable flaps mounted between the electromagnetic sensor and the lens sheet; and mechanically attaching at least one control mechanism adapted to maneuver said one or more controllable flaps to determine the range of distances at which the sensing device can detect people.

8. The method according to claim 7, the method further comprising blocking, by at least one of the one or more controllable flaps, the lenses from a particular row of the multiple parallel rows that are arranged one above the other to reduce the range of distances from which the sensing device can detect people.

9. The method according to claim 7, wherein lenses of different rows are of different sizes to reduce a difference between frequencies of the radiation received from objects passing the sensor at different distances from the sensor.

10. The method according to claim 9, wherein each member of the first row of a plurality of Fresnel lenses has a first diameter measured on a principle plane of each member of the first row of a plurality of Fresnel lenses, each member of the second row of a plurality of other Fresnel lenses has a second diameter measured on the principle plane of each member of the second row of a plurality of other Fresnel lenses, the second diameter being different to the first diameter.

11. The method according to claim 10, wherein the first row of a plurality of lenses is closer to the top side of the array than said second row of a plurality of other lenses, and the first diameter is smaller than said second diameter.

12. The method according claim 7, wherein:
the first row of the plurality of lenses has a first focal length;
the second row of the plurality has a second focal length; and
said first focal length and said second focal length are different.

13. The sensing device according to claim 1, wherein the range of distances decreases as the one or more controllable flaps approaches the sensor.

14. The sensing device according to claim 1, wherein the at least one control mechanism is mechanically attached to one side of the one or more controllable flaps for changing an angle between said one or more controllable flaps and a surface of the electromagnetic sensor (118);
wherein the angle determines the range of distances at which the sensing device can detect people;
wherein each member of the first row has a first diameter measured on a principle plane of each member of the first row and each member of the second row has a second diameter which is different to the first diameter and measured on the principle plane of each member of the second row.

* * * * *